United States Patent [19]

Kleeberg et al.

[11] Patent Number: 4,729,906
[45] Date of Patent: Mar. 8, 1988

[54] METHOD FOR PRODUCING GLOW POLYMERISATE LAYERS

[75] Inventors: Wolfgang Kleeberg, Erlangen; Johann Kammermaier, Unterhaching; Gerhard Rittmayer; Rolf-Winfried Schulte, both of Erlangen, all of Fed. Rep. of Germany

[73] Assignee: Siemens Aktiengesellschaft, Munich, Fed. Rep. of Germany

[21] Appl. No.: 824,937

[22] Filed: Jan. 31, 1986

Related U.S. Application Data

[63] Continuation of Ser. No. 630,717, Jul. 13, 1984, abandoned.

[30] Foreign Application Priority Data

Jul. 22, 1983 [DE] Fed. Rep. of Germany ..... 33263779

[51] Int. Cl.⁴ .............................................. B05D 3/06
[52] U.S. Cl. ..................................................... 427/41
[58] Field of Search ................ 427/41, 45.1; 204/165, 204/168, 169

[56] References Cited

U.S. PATENT DOCUMENTS

| | | | |
|---|---|---|---|
| 3,847,652 | 11/1974 | Fletcher et al. | 427/41 |
| 4,143,949 | 3/1979 | Chen | 427/41 |
| 4,365,587 | 12/1982 | Hirose et al. | 427/41 |
| 4,395,435 | 7/1983 | Sanpei et al. | 427/41 |
| 4,407,852 | 10/1983 | Sapieha et al. | 427/41 |
| 4,429,024 | 1/1984 | Ueno et al. | 427/41 |

OTHER PUBLICATIONS

Schreiber et al, Ind. Eng. Chem. Prod. Res. Dev., vol. 17, No. 1, 1978, pp. 27–30.

*Primary Examiner*—John H. Newsome
*Attorney, Agent, or Firm*—Kenyon & Kenyon

[57] ABSTRACT

Glow polymerisate layers can be generated on a substrate, starting from hydrocarbons and/or fluorocarbons, by means of a high-frequency, low-pressure glow discharge. Glow polymerisates completely saturated with hydrogen or fluorine are obtained when the glow discharge is carried out in the microwave range between 0.5 and 1.000 GHz and if the amplitude $E_0$ of the effective field strength in the vicinity of the substrate no greater than 850 V/cm.

6 Claims, 1 Drawing Figure

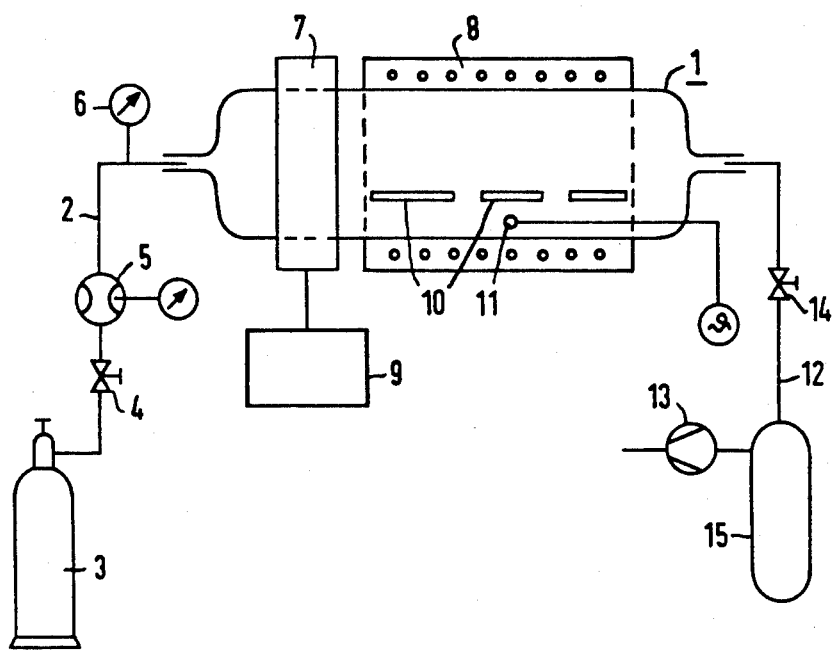

4,729,906

METHOD FOR PRODUCING GLOW POLYMERISATE LAYERS

This application is a continuation of application Ser. No. 630,717, filed July 13, 1984, now abandoned.

BACKGROUND OF THE INVENTION

This invention relates to a method for producing glow polymerisate layers upon a substrate from monomeric hydrocarbons and/or fluorocarbons by means of a high frequency low-pressure glow discharge.

Glow polymerization in which polymers are produced from gaseous organic monomers on a substrate by low-pressure plasma excitation, permits the preparation of thin, uniform and porefree layers. This method also permits use of monomers which can not otherwise be polymerized. Particularly advantageous means of generating low-pressure plasmas for glow polymerization are high-frequency discharges, specifically those in the radio-frequency range (see: A. T- Bell in S. Veprek, M. Venugopalan, "Plasma Chemistry III", Springer Verlag Berlin Heidelberg, 1980, pages 43 ff.), i.e. in the range between 0.1 and 100 MHz (RF), and those in the microwave range (see: "J. Macromol. Sci.-Chem." A 14 (3), pages 321 to 337, 1980), i.e. in the range between 0.1 and 1000 GHz (MW). In these ranges the energy can be coupled capacitively or inductively into the plasma (i.e. into the reactor in which the glow polymerization is performed) without difficulty by use of external lines, or by hollow conductors such as resonator cavities, the so-called "slow wave structures", etc., whereby a reactive interaction between the electrically conducting parts and the plasma is avoided.

An interesting aspect in connection with glow polymerization is the manufacture of layers which are formed from hydrocarbon (CH) and/or fluorocarbon (CF) monomers. It should be possible to produce from these organic monomers, which comprise a broad spectrum of polymerizable compounds, glow polymerisates with a wide range of properties that can be selected with great specificity. For instance, the production of thin layers on a CH and/or CF basis for low-loss dielectrics; coatings which have low-energy surfaces and thereby, liquid-repellant coatings; sensitive resist layers for dry structuring processes in x-ray and electron beam lithography; thin film diaphragms for electromedical applications and electrets for various applications is a possible use of this technique. It should also be possible to produce these compositions with quantitatively and qualitatively high yields.

However, if high-frequency RF and MW glow discharges are used in the polymerization of CH, CF and CH—CF monomers, the resulting polymers have an H and/or F content which is lower than that of the monomers. The reason for this is that H and F atoms as well as species rich in H and F atoms are split off in the plasmas from the monomer molecules by collision with charged particles, particularly the electrons, and are removed with the gas stream of the monomer component and are thereby lost. As a result, the layers which are formed have a less than stoichometric C/H or C/F composition. Primary unsaturated structures and radicals are thereby formed in the layers which can react oxidatively in the presence of air or oxygen and produce undesirable, undefined polar structures. These structures cause, for instance, a degradation of dielectric properties, an increase in the water absorption and a chemically changed behavior in the action of solvents (lyophility).

SUMMARY OF THE INVENTION

It is an object of the invention to further develop a method of the kind mentioned at the outset for producing glow polymerisate layers in which monomeric hydrocarbons and/or fluorocarbons serve as the starting materials in such a manner that glow polymerisates are directly produced which are completely saturated with hydrogen or fluorine, respectively.

According to the invention, this is achieved by the provision that the glow discharge is carried out in the microwave range between 0.5 and 1000 GHz and that, in the microwave discharge, the amplitude $E_0$ of the effective field strength in the vicinity of the substrate is no greater than 850 V/cm.

In the method according to the invention, there is no splitting-off of H or F atoms from the monomers employed. Rather, predominantly polymerizable $CH_2$ or $CF_2$ species are generated therefrom by the splitting C—C bonds. This is not generally the case in high-frequency discharges in the RF range. In the method according to the invention, where MW discharges are used, the energy of the electrons acting primarily as collision particles is obviously limited in such a way that predominantly C—C bonds, but not the stronger C—H or C—F bonds of the monomers are split. Theoretical considerations confirm this assumption.

The energy U which can be transmitted by electrons onto the plasma by an alternating electric field (with a wave-shape which is assumed to be sinusoidal) is, in the case when the field frequency $\nu$ is smaller than the plasma collision frequency $\nu_p$ which correlates with the free path length of the electrons, generally described by:

$$U = \frac{1}{2} \frac{e^2 E^2}{m(2\pi\nu)^2}$$

where
 e is the elementary charge
 E is the electric field strength acting on the electrons at a given location (E is a function of the external field applied and of the location),
 m is the mass of an electron and
 $\nu$ is the field frequency.

The mean value of the energy in time ($U_t$) is $$U_t = \frac{1}{4} \frac{e^2 E_0^2}{m(2\pi\nu)^2}$$

where
 $E_0$ is the amplitude of the effective field strength E.

The energy which can be transmitted to the plasma by electrons due to collision processes is therefore proportional to the square of the reciprocal field frequency. This means that, for comparable values of $E_0$, very much less energy is transmitted in MW discharges to the monomer molecules than in RF discharge. Since, on the other hand, the electron density in MW plasmas is higher by some orders of magnitude than in RF plasmas, considerably more electrons with uniform energy distribution are available in MW plasmas. According to the method of the invention, an upper limit is placed upon $U_t$ by a suitable choice of $E_0$. This can be accomplished, by example, regulating the field strength impressed from the outside or by the regulating the position of the substrate in arrangements with a resonator cavity. The upper limit is placed in such a manner that the electrons split predominantly C—C bonds, but not the stronger C—H and C—F bonds. According to the invention, the value 850 V/cm is fixed as the upper limit for $E_0$.

With the method according to the invention, layers are obtained due to the selective splitting of the C—C bonds, which have chemically the same composition and the same structural features as the monomers used. This is a substantial advantage of this method, which is important also in the preparation of layers with electret properties, for instance, from CH—CF compounds.

From Canadian Pat. No. 1,141,020, an electret is known which consists of a film of plasma-polymerized dielectric material which has a volumetric space charge. This film is plasma-polymerized at a frequency no greater than 30 GHz, preferably at a frequency between 50 Hz and 10 GHz. The frequency can be in the microwave frequency range. Monomers which are said to be useful in the plasma polymerization are hexamethyldisiloxane, silane, ethylene, styrene and tetrafluoroethylene. However, no reference is found in that patent to the manufacture of fully hydrogenated and fluorinated glow polymerisates nor is there any reference to or recognition of one of the most important features of the method according to the invention namely, to carry out the microwave discharge in such a manner that the amplitude of the effective field strength in the region of the substrate is less than or equal to 850 V/cm.

Otherwise, the use of a microwave discharge as known to date is limited in plasma chemistry largely to the initiation of radical reactions (see in this connection: H. Drost, "Plasmachemie", pages 71 and 72, paragraph 2.3.3.6), for which purpose high-energy electrons are required.

The plasma collision frequency $v_P$ can be influenced via the free path length of the electrons and the flow rate of the monomer gas (through the discharge arrangement) and thereby, indirectly the tendency of the splitting processes, even though to a small degree. Shortening the free path length or an increase of the plasma collision frequency results here in an increased splitting of C—C bonds because the electrons then acquire lower average energies. The microwave discharge of the claimed process is advantageously carried out a pressure of 0.1 to 1 mbar and preferably at a pressure of about 0.5 mbar.

In the method according to the invention, it is preferred that the substrate be heated to temperatures up to about 200° C. during the microwave discharge. Glow polymerisate layers with excellent properties are obtained by this technique. The glow discharge itself takes place preferably in the microwave range between 0.5 and 100 GHz.

The following compounds can be used as hydrocarbon monomers in the method according to the invention, for instance: Ethylene, propene, butene, butadiene and cyclohexane. Preferably, perfluorized organic compounds, i.e. fluorocarbons are used in this method. Octafluorocyclobutane $C_4F_8$ (perfluorocyclobutane) is particularly useful as a starting material in this process, but other perfluorized hydrocarbons can be used, such as tetrafluoroethylene $C_2F_4$, perfluoropropene $C_3F_6$, perfluorobutene $C_4F_8$ and perfluorocyclohexane $C_6F_{12}$.

The glow polymerisate layers made by the method of this invention, not only exhibit freedom from pores and possess a uniform structure, but in addition, they are stable as to their chemical composition and their physical properties and are equivalent to the corresponding conventionally prepared polymerisates such as polyethylene (PE), polytetrafluoroethylene (PTFE), tetrafluoroethylenehexafluoropropane copolymerisate (FEP) and to similar materials. The reason for this is that the glow polymerisates prepared in accordance with the method of the invention are completely hydrogenated or fluorized since a splitting-off of H and/or F atoms from the monomers is very largely prevented in the plasma, and the layers prepared therefore exhibit (within analytical determination limits) a H/C or F/C ratio corresponding to the monomers.

DESCRIPTION OF THE DRAWING

The drawing illustrates an apparatus suitable for use in the claimed method.

DETAILED DESCRIPTION OF THE INVENTION

The invention will now be explained in greater detail with the aid of an example and by reference to the drawing figure.

In the drawing, an advantageous device for carrying out the method according to the invention is shown. A reactor 1, i.e., a reaction vessel is connected via line 2 to a supply vessel 3 for a monomeric hydrocarbon or fluorocarbon compound or for a monomer mixture. In the line 2, a needle valve 4 and a flow meter 5 for the monomer gas are arranged. At the line 2, a pressure gauge 6 is also provided. If required, the reactor can be connected in a similar manner to two or more supply vessels.

The reactor 1 is surrounded by a cavity 7, i.e., a hollow conductor of given size, and an oven 8; the cavity 7 is connected to a microwave generator 9. Within the reactor 1 are arranged in the vicinity of the oven 8, one or more substrates 10. A thermocouple 11 serves as a means for determining the temperature in the vicinity of the substrate 10. The exit of the reactor 1 is connected to a vacuum pump 13 via a line 12. In the line 12, a reducing valve 14 and a cooling trap 15 with liquid nitrogen are arranged.

In the device shown in the figure a glow polymerisate layer is made on a substrate by a microwave discharge with a frequency of, for instance, 2.45 GHz from $C_4F_8$. The monomer gas is conducted with a flow rate of 13 standard cubic centimeters per minute and a gas pressure of 0.5 mbar through the reactor in the form of a quartz tube with an inside diameter of 2.5 cm. The microwave resonator arranged around the quartz tube feeds the microwave energy with a power of up to 200 W into the gas discharge fired by means of a Tesla coil. The substrate is placed in the quartz tube outside the resonator, and specifically downstream with the gas, it can also be placed in the reactor upstream with the gas, but likewise outside the cavity.

On the substrates, at different distances from the microwave resonator, glow polymerisates are deposited which show a transition of harder, brittle and clear layers to softer whitish layers. In a certain region of the reactor which within the plasma corresponds obviously to the field strength suitable for splitting C—C bonds, the layers are clear and not brittle and are similar to PTFE prepared conventionally, as determined by IR spectroscopy; in addition, ESCA examinations result in an F/C ration of 2:1. Likewise, the dielectric measurements with respect to insulating resistance, permittivity and loss factor result in an equivalence of the microwave polymerisate prepared according to the invention with conventionally prepared PTFE.

What is claimed is:

1. A process for the formation of polymer layers on a substrate comprising glow discharging fluorocarbon monomers at a high frequency and a low pressure wherein said glow discharging is conducted by means of a hollow wave conductor and in the absence of a carrier gas in the microwave range of between 0.5 and 1,000 GHz and wherein the substrate is disposed outside of the hollow wave conductor and wherein the amplitude $E_0$ of the effective field strength in the vicinity of said substrate is no greater than 850 V/cm.

2. The process of claim 1 wherein said glow discharging is carried out at a pressure of from 0.1 to 1 mbar.

3. The process of claim 1 or 2 wherein said substrate is heated to a temperature no higher than 200° C.

4. The process of claim 3 wherein said fluorocarbon monomers are perfluorocarbons.

5. The process of claim 4 wherein said perfluorocarbon is octafluorocyclobutane.

6. The process of claim 4 wherein said perfluorocarbon is perfluorocyclohexane.

* * * * *